UNITED STATES PATENT OFFICE.

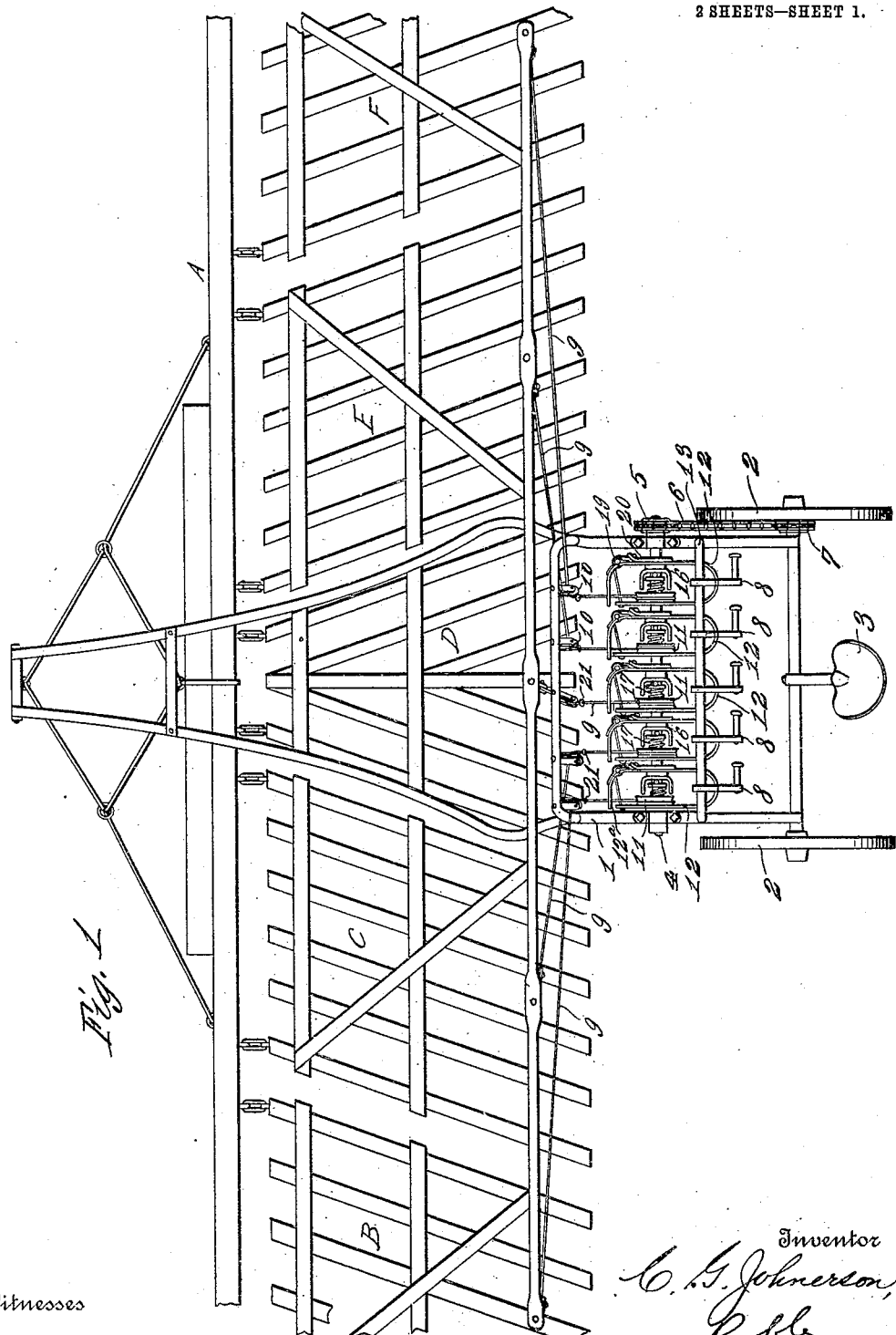

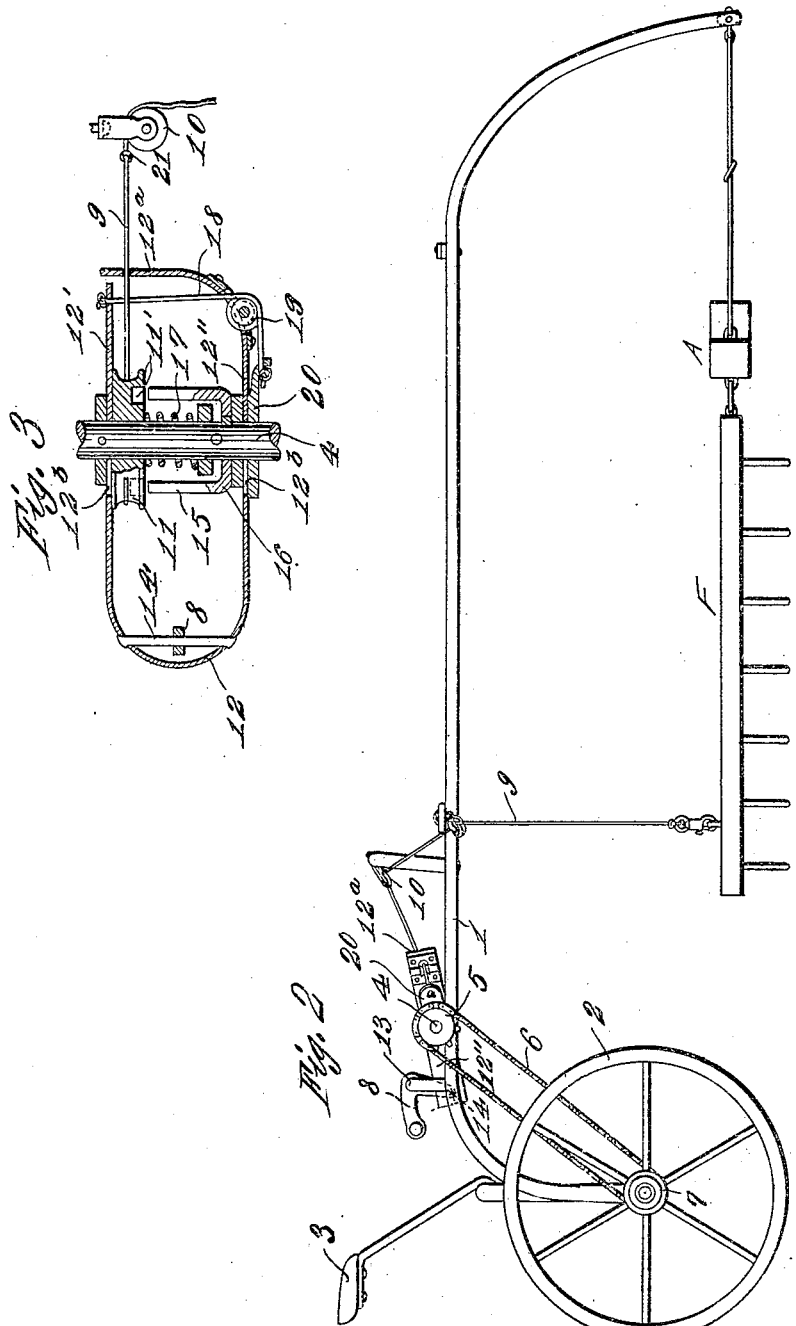

CARL G. JOHNERSON, OF MADDOCK, NORTH DAKOTA.

HARROW.

955,515. Specification of Letters Patent. Patented Apr. 19, 1910.

Application filed July 12, 1909. Serial No. 507,152.

*To all whom it may concern:*

Be it known that I, CARL G. JOHNERSON, a subject of the King of Norway, residing at Maddock, in the county of Benson and State of North Dakota, have invented certain new and useful Improvements in Harrows, of which the following is a specification.

The present invention consists of a riding attachment for harrows and embodies primarily special means forming the essential feature of the invention whereby any one or more sections of a harrow may be elevated in order to disengage the teeth thereof from any obstacles or foreign matter that may have become clogged therein or otherwise engaged therewith.

For a full understanding of the invention, reference is to be had to the following detail description and to the accompanying drawings, in which—

Figure 1 is a top plan view showing the invention in operative relation to a common type of harrow embodying a plurality of sections mounted for independent movement; Fig. 2 is a side elevation showing the parts arranged substantially as in Fig. 1, and Fig. 3 is a detail sectional view of one of the clutch devices adapted for operation by the foot to elevate the rear end of a section of the harrow for the purpose before mentioned.

Throughout the following detail description and on the several figures of the drawings similar parts are referred to by like reference characters.

Referring particularly to the drawings and specifically describing the details of construction and the advantages of the present invention it will be observed that the harrow illustrated is of the common type embodying a transverse draft beam A and a plurality of harrow sections provided with suitable teeth and designated B, C, D, E, and F. The several sections of the harrow are connected in a flexible manner with the beam A. The present invention involves the peculiar means employed for raising the rear ends of the harrow sections.

Located in rear of the harrow is a wheeled frame 1, the wheels of which are denoted 2. A suitable seat 3 is mounted on the rear portion of the frame 1 to support a driver, and on the upper front portion of the frame is mounted a transverse shaft 4 having on one end thereof a sprocket wheel 5 about which passes a chain 6 which also passes about another sprocket wheel 7 on a wheel 2 of the frame 1, so that the shaft 4 is driven constantly from the said wheel 2 while the implement is advanced over a field.

Mounted on the shaft 4 are a plurality of clutch devices operable by foot levers 8, one of which is provided for each clutch device. Each clutch device is connected for operation of a cable or rope 9 which extends over a pulley 10 on the front portion of the frame 1 and thence to a point of connection with the rear end of a harrow section. In other words, the several harrow sections B, C, D, E, and F are attached to ropes 9 which are connected by snap hooks to the rear ends of said sections, and which ropes lead to pulley wheels or winding drums 11 on the shaft 4, so that the said connections or ropes 9 may be wound about the drums 11 in order to raise the rear ends of the sections of the harrow.

The winding drums 11 are loosely mounted on the shaft 4 and the clutch devices before mentioned are provided one for each winding drum. Since all of the clutch devices are the same in construction one only will be described. As shown clearly in Fig. 3 the clutch device referred to consists of a somewhat U-shaped frame 12 having the sides 12′ and 12″. The foot lever 8 adjacent to the frame 12 for operation thereof is of bellcrank form and is pivoted to a cross bar 13 in rear of the shaft 4. The lower arm of the lever 8 is connected with a transverse pin 14 on the rear end of the frame 12. The winding drum 11 operated by the frame 12 is loose on the shaft 4 and between the sides of said frame, said drum having recesses 11′ in a side thereof in which are adapted to engage the extremities of clutch arms 15 projecting from a clutch member 16 which is secured to the shaft 4 for rotation therewith. A coiled spring 17 interposed between the drum 11 and member 16 normally holds the parts 16 and 11 out of coöperation. A flexible connection or rope 18 passes from a point of connection with the side 12′ of the frame 12 about a wheel 19 on the side 12″ and is connected to a plate 20 adjacent to said side 12″. The connection 18 is normally taut so that when the foot lever 8 is depressed forcing the frame 12 forwardly a pull is exerted on the connection 18 moving the side 12′ of the frame toward the side 12″ and thus engaging the drum 11 with the arms 15 of the clutch member 16. This connects the shaft 4 for rotation of the drum 11 and winds up the connection 9 of said drum elevating the section of the harrow attached to said rope 9 at the rear end of said section. As the rope 9 winds about the drum 11 a projection 21 in the length of said rope strikes an extension 12$^a$ of the side 12″ of the frame 12, and this action forces the frame 12 rearwardly relieving the tension on the rope 18 and permitting the sides of the frame to move into their normal more remote positions, and separation of the drum and clutch arms 15. As soon as the clutch member 16 is disengaged from the drum 11 the latter will be free to rotate so as to permit the rope 9 to unwind therefrom and lower the rear end of the section of the harrow which has been previously elevated.

The forward and rearward movement of the frame 12 on the shaft 4 is permitted by providing in the opposite sides of the frame slots 12$^b$ through which the shaft 4 passes.

From the foregoing it will be apparent that any selected section of the harrow may be elevated at its rear end at the will of the operator and will be automatically lowered in the operation of the invention.

Having thus described the invention, what is claimed as new is:

1. In combination, a toothed harrow section, and means for raising and lowering said section comprising a wheeled frame, a constantly driven shaft thereon, a winding drum on said shaft, a connection between said drum and the harrow section, and means for controlling rotation of the drum with respect to the shaft to cause winding and unwinding of the connection between said drum and the harrow section.

2. In combination, a harrow section, a supporting frame, a winding drum on said frame, a cable connecting said drum with the section, means for turning the drum to wind up the cable and elevate the harrow section, and means for automatically lowering the harrow section after it has been raised a certain distance.

3. In combination, a harrow comprising sections, a wheeled frame, a constantly driven shaft on the frame, a plurality of drums loose on said shaft, cables connected with the harrow sections, and each connected with a drum to be wound thereon, means for connecting the drums for rotation with the shaft to elevate the harrow sections, and automatic means for restoring the drum to loose non-rotative connection with respect to the shaft.

4. In combination, a harrow consisting of a plurality of sections, a wheeled frame connected with the harrow, a constantly driven shaft mounted on the frame, a plurality of drums loose on said shaft, cables connecting the drums with the harrow sections and adapted to wind about the drums, means for independently connecting the drums to the shaft for rotation therewith, and automatic means for disconnecting the drum from rotation with said shaft.

5. In combination, a harrow comprising sections, a wheeled frame connected with the harrow, a drive shaft on said frame, winding drums on said shaft, cables connected with the harrow sections and adapted to wind on said drums, and a clutch device for each drum comprising a frame slidable on the shaft and having spaced sides, one side of the frame engaging the adjacent drum, a tension connection between said frame-side, and the shaft, a foot lever for moving the frame in one direction whereby the side above mentioned moves the adjacent drum longitudinally on its shaft, a clutch member rotatable with the shaft, and engageable with the drum on movement of the latter lengthwise of the shaft, and means for returning the frame to its normal position controlled by winding of the cable on the drum.

In testimony whereof I affix my signature in presence of two witnesses.

CARL G. JOHNERSON.

Witnesses:
J. F. HEGGE,
A. M. SHEIMO.